(12) United States Patent
Meyer (10) Patent No.: US 6,719,493 B1
(45) Date of Patent: Apr. 13, 2004

(54) METHOD AND SYSTEM FOR ENCASING AN ENDLESS, LAID PIPELINE CONDUIT WITH BACKFILL CONCRETE

(75) Inventor: Freidrich Meyer, Windach (DE)

(73) Assignee: Friedrich Meyer, Windach (DE)

( * ) Notice: Subject to any disclaimer, the term of this patent is extended or adjusted under 35 U.S.C. 154(b) by 0 days.

(21) Appl. No.: 10/031,127

(22) PCT Filed: Jul. 13, 2000

(86) PCT No.: PCT/DE00/02285

§ 371 (c)(1),
(2), (4) Date: May 2, 2002

(87) PCT Pub. No.: WO01/04463

PCT Pub. Date: Jan. 18, 2001

(30) Foreign Application Priority Data

Jul. 13, 1999 (DE) .......................................... 199 32 647

(51) Int. Cl.⁷ .............................................. E21D 11/10
(52) U.S. Cl. ................................. 405/150.2; 405/184.2
(58) Field of Search ................................ 405/146, 151, 405/150.2, 150.1, 184.2, 266–268

(56) References Cited

U.S. PATENT DOCUMENTS

| 1,778,099 | A | * | 10/1930 | Webb | ....................... 405/150.1 |
| 2,089,149 | A | | 8/1937 | Longenecker | |
| 4,728,223 | A | * | 3/1988 | Rice | ......................... 405/184.2 |
| 5,190,705 | A | * | 3/1993 | Corazza | ................... 264/36.16 |
| 5,419,632 | A | | 5/1995 | Stephens | |

FOREIGN PATENT DOCUMENTS

| EP | 0 205 853 A2 | | 5/1986 |
| FR | 2 691 748 A1 | | 5/1992 |
| FR | 2 752 877 A1 | | 9/1997 |
| GB | 2167796 | * | 6/1986 |

* cited by examiner

Primary Examiner—Heather Shackelford
Assistant Examiner—Sunil Singh
(74) Attorney, Agent, or Firm—Baker & McKenzie (57) ABSTRACT

The present invention provides, in one aspect, a method and corresponding system in which the production costs may be reduced by virtue of the fact that the laying of the pipe conduit on the one hand and the encasing of the pipe conduit with backfill concrete on the other hand may be carried out in parallel.

23 Claims, 9 Drawing Sheets

METHOD AND SYSTEM FOR ENCASING AN ENDLESS, LAID PIPELINE CONDUIT WITH BACKFILL CONCRETE

TECHNICAL FIELD OF THE INVENTION

The invention relates to a method and a system for encasing a pipe conduit, laid in a gallery in an endless manner, with backfill concrete, with a working direction advancing in the axial direction of the gallery.

In particular, the invention relates to the laying of large pipes in galleries, which may be of any desired length. When "galleries" are referred to below, this is also intended to denote supply tunnels and other channels. In this case, the galleries may be horizontal or also inclined, as used in particular in drinking water supply.

In the present connection, the expression "backfill concrete" refers to a product which is pumpable, can be hardened and is suitable for filling in a cavity-free manner by subsequent grouting. Products such as "Füllbinder" from Schwenk Zement and "Dämmer" from Anneliese are currently on the market. The dry mixture of these products essentially comprises stone dust and cement.

The present invention relates primarily to pipe conduits made of steel; however, it can likewise be used in the case of pipe conduits made of concrete, cast materials or plastic materials.

DESCRIPTION OF THE RELATED ART

According to the prior art, for laying pipelines, it is known to move sectional conduits into the galleries and to connect them to one another by means of internal welds. So that the pipelines are firmly embedded in place in the cavities, the pipelines are encased with backfill concrete which should as far as possible completely fill the space between pipe conduit and gallery wall. In addition to the firm embedment of the pipe conduit in the gallery, the backfill concrete, on account of its basic properties, additionally assumes the function of the anti-corrosion protection of the otherwise unprotected steel lines.

In detail, the procedure is as follows: the pipes are introduced in sectional conduits into the cavity and are connected to one another there up to a maximum length of 100 m and are attached to the already encased pipe conduit. There are often considerable technical difficulties when bringing the new sectional conduit together with the fixed pipe end, since the freedom of movement of the sectional conduit is very restricted as a result of the move-in construction and the uplift safety features. After the advance of a pipeline of a maximum length of one hundred meters, the annular space at the open line end is partitioned for the filling.

The partition is provided with complicated rubber seals in order to produce the pressure-tight closure between pipe outer wall and cavity inner wall. In addition, the partition worked fair on one side must be solidly supported at the free inside of the cavity on 20 account of the filling pressure to be expected, as a result of which the accessibility to the partition is considerably restricted.

The annular space is filled with backfill concrete in a single operation via the delivery lines directed through the partition. Uplift safety features along the pipeline absorb the full uplift on the pipeline in the roof region. Uplift movements of the pipeline produce deformations in the region of the partitioning and lead to leakages during the filling operation. Due to sudden superimposition of liquid pressure and filling pressure toward the end of the filling, there is the risk of the partition being pressed to an excessive degree and of the backfill concrete pouring into the working space.

The still full delivery lines are to be emptied through a return line and are to be cleaned; the filling material is to be disposed of. After the backfill concrete starts to harden (about 3 days), the settling space at the roof can be grouted. This residual-space grouting is effected over the entire section length (100 m) from the partition region. Due to the fact that the operation for cleaning the delivery lines is complicated, the mixing of the dry material is effected upstream of the partition. The material required for this and the machines are to be introduced separately and removed again. The partition cannot be removed until after the consolidation of the backfill concrete at the roof.

No pipe construction can take place during the filling of the annular space up to the time when the partition is removed. During the period of the subsequent pipe construction, no filling work can be carried out. Since this involves underground working, the normal working day is 24 hours. Pipe-laying work and filling work are carried out by different professional groups in shift work. Since the laying work and the filling work cannot be carried out in parallel and there are in addition long periods of unavoidable interruptions of work on account of the setting process, this work cannot be carried out efficiently.

The settling volume of the backfill concrete is 3%. A large settling volume is produced by filling the annular space in one operation. By subsequent grouting of this settling space in a separate operation, a relatively large settling volume is again produced, which may be the cause of undesirable conductivities (water course and gas accumulation) at the cavity roof. Filling at the roof in a cavity-free manner is not ensured. In the long term, soil settlement due to a cavity which is not grouted is to be expected.

SUMMARY OF THE INVENTION

The object of the present invention is essentially to specify a method and a corresponding system in which the production costs in particular can be reduced by virtue of the fact that the laying of the pipe conduit on the one hand and the encasing of the pipe conduit with backfill concrete on the other hand can be carried out in parallel.

With regard to the method, this object is achieved according to the invention essentially by the following method steps:

a) dividing the gallery including the pipe conduit into sections of preferably equal length, b) producing an opening at the pipe apex in each section, c) introducing the backfill concrete layer by layer through the pipe conduit and through the opening of each section, at least the introduction of the respectively last layer preferably being effected in sections following one another in the working direction, and d) closing the openings of the filled sections.

The essence of the invention therefore lies in the fact that the introduction of the backfill concrete into the cavity surrounding the pipe conduit is effected solely from the interior of the pipe conduit, so that the pipe conduit can be laid without hindrance. The separation of pipe laying and pipe encasing into work cycles independent of one another guarantees an undisturbed continuous working method with execution quality and economical production costs. Therefore, while the backfill concrete is introduced, if need be in a loose sequence, section by section the opening produced beforehand is closed again, the pipe-laying work can be carried out in an undisturbed manner at the front as viewed in the working direction.

In an especially preferred further development of the method according to the invention, the following further steps are provided:

e) fastening of subsequent-grouting lines in each section, these subsequent-grouting lines running at the roof of the gallery in the axial direction and ending above the opening, to be precise before the method step c), and f) after method step c), subsequent grouting by introducing backfill concrete into the subsequent-grouting lines through the pipe conduit and through the respective opening.

Once the backfill concrete has settled to a certain extent during its hardening, a cavity occurs at the roof of the gallery, and this cavity can be filled reliably and completely via the firmly installed subsequent-grouting lines. In this way, encasing of the pipe conduit in a virtually cavity-free manner is possible.

Furthermore, in a preferred development of the invention, provision is made for flow barriers to be fitted at the respective section boundaries before method step c), which flow barriers may in particular be produced from like-grained concrete. The placement of such flow barriers below the pipe bottom, which is preferably effected in the course of the continuous pipe laying, limits the respective section of the cavity filling in the critical uplift region. The uplift force of the backfill concrete must not exceed the weight of the pipeline. The flow barriers of like-grained concrete are placed during the continuous pipe laying preferably at least up to the level of the equilibrium limit between pipe weight and uplift force.

In an advantageous development of the invention, the introduction of the backfill concrete layer by layer is effected in the following steps:

c1) introduction of at least one filling layer until the pipe-conduit section of a section has not quite started to float on the filling layer, c2) introduction of a second filling layer of specifically lighter backfill concrete after the settling and consolidation of the first filling layer, and c3) introduction of further filling layers after at least partial consolidation of the preceding layer.

The introduction of the second filling layer of specifically lighter backfill concrete serves to close the settling gap produced at the pipe and to ensure the adhesion forces between pipe and backfill concrete.

With regard to the system, the object mentioned further above is essentially achieved in that the following is provided in each section:

a reclosable opening at the pipe apex, a filling connection which is fastened in the region of the opening to the pipe conduit and is oriented perpendicularly upward, a pressure line, which runs in the interior of the pipe conduit and can be releasably connected to the filling connection, for backfill concrete, at least one firmly installed subsequent-grouting pipeline arrangement which is arranged at the roof of the gallery and ends in the region of the filling connection, and at least one subsequent-grouting line which runs in the interior of the pipe conduit and can be releasably connected to the filling connection instead of the pressure line and can be connected to the at least one firmly installed subsequent-grouting pipeline arrangement.

To fill the cavity, first of all the pressure line is attached to the respective pipe connection and the sections in question are filled completely layer by layer. After the backfill concrete has settled, the subsequent-grouting line is connected through the filling connection to the firmly installed subsequent-grouting pipeline arrangement and subsequent grouting is effected. After the opening is closed again, the firmly installed subsequent-grouting pipeline arrangement remains in the gallery.

Since the opening of each section is arranged between the two ends of the section, two firmly installed subsequent-grouting pipeline arrangements are preferably provided, and these subsequent-grouting pipeline arrangements extend from the opening or from the filling connection essentially in opposite directions in order to cover essentially the entire section.

In a preferred development of the invention, each subsequent-grouting pipeline arrangement has a pipe section with a number of radial through-holes which are distributed over the pipe section and are closed to begin with, in particular by means of adhesive tape, so that they do not become clogged during the filling with backfill concrete. It is not until the subsequent-grouting device is activated that these through-holes open on account of the high pressure, and backfill concrete can escape outward through the through-holes and fill the remaining cavity.

According to a further advantageous feature of the invention, a line for supplying flushing water is also provided, which line runs in the interior of the pipe conduit and can be releasably connected to the filling connection instead of the pressure line for backfill concrete. This water flushing is activated before the introduction of the last layer or after the introduction of the last layer in the respectively preceding section in order to ensure the conductivity for the subsequent filling.

BRIEF DESCRIPTION OF DRAWINGS

Further advantageous features of the invention follow from the remaining subclaims and from the description below, in which a preferred exemplary embodiment of the invention is described in more detail with reference to the drawing. In the drawing, in semi-schematic representation:

LIST OF DESIGNATIONS:

1 Gallery
2 Pipe conduit
3 Steel pipe
4 First section
5 Second section
6 Third section
7 Fourth section
8 Fifth section
9 Sixth section
10 Seventh section
11 Transport rollers
12 Internal weld
13 Subsequent-grouting pipeline
14 End wall
15 Free ends, angled downwards
16 opening(s)
17 Arched plate
18 Filling connection 19 Pipe section
20 Cavity
21 Plastic pipe
22 Cavity apex
23 Pipe section
24 Flow barrier
25 First filling layer
26 Second filling layer
27 Third filling layer
28 Fourth filling layer
29 Fifth filling layer
30 Uplift safety feature
31 Pressure line
32 Water flushing device
33 Filling-level control
34 Pipeline axis
35 Settling water and/or air
36 External welds
37 Venting line
38 Subsequent grouting line
39 Compression seal
40 Compression seal
41 Pipe plate

DETAILED DESCRIPTION OF THE INVENTION

The exemplary embodiment shown involves a gallery 1 which has an inside diameter of 2900 mm and, in the representation selected, has a slight falling gradient from right to left. The pipe conduit 2 consists of steel pipes (generally designated 3) having a diameter of 2200 mm, the individual pipes having a length of 12 m. The length of each section 4–10, which primarily results from the gradient and the flowability of the backfill concrete selected, is 150 m in the present case. The density of the backfill concrete is about 1.54 kg/dm$^3$.

The dry backfill concrete is generally delivered to the site in silo trains (about 30 t filling weight); the mixing with water to produce ready-to-place backfill concrete is effected in mixing devices outside the pipeline, generally on the surface.

The pipe conduit 2 is introduced into the gallery 1 in a conventional manner by individual pipe sections 4–10 being brought into position by means of transport rollers 11 and by the individual pipe sections 4–10 being successively welded to one another by means of internal and external welds 12, 36. The end of the gallery 1 is closed by means of an end wall 14 (see FIG. 1).

Figure 1A:
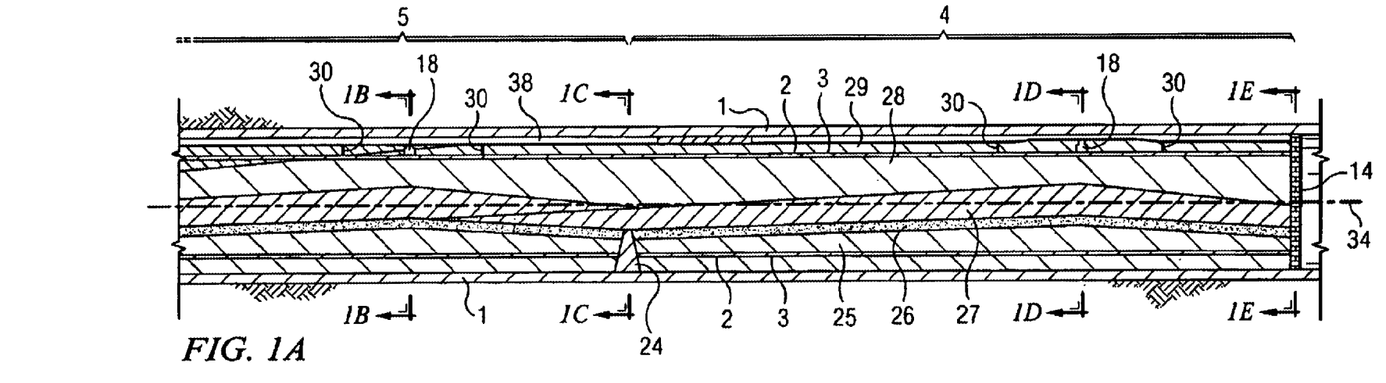
FIGS. 1 to 4 each show a horizontal section through the gallery, in which case in particular the various layers of the backfill concrete already introduced can be seen; furthermore, various cross sections through the gallery at the respective positions are shown below the sectional view in the longitudinal direction of the gallery. The figures in each case follow one another from right to left.
Figure 1B:
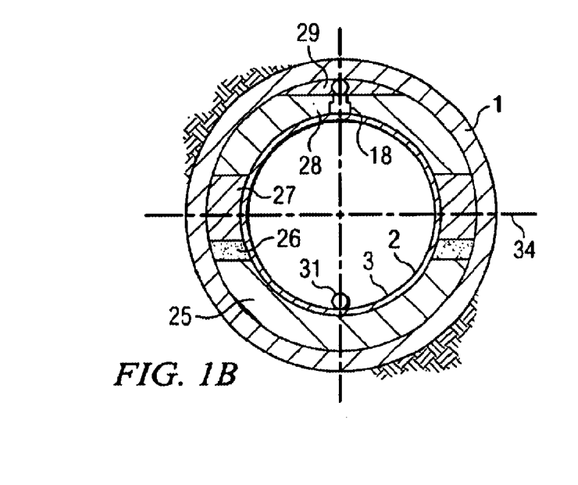
Figure 1C:
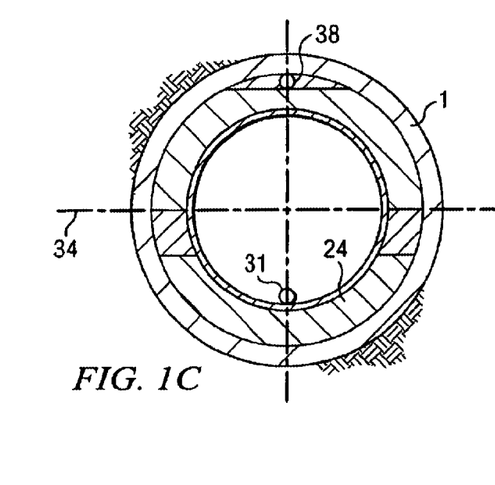
Figure 1D:
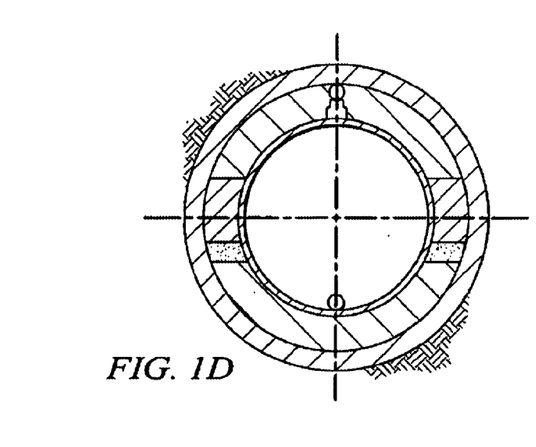
Figure 1E:
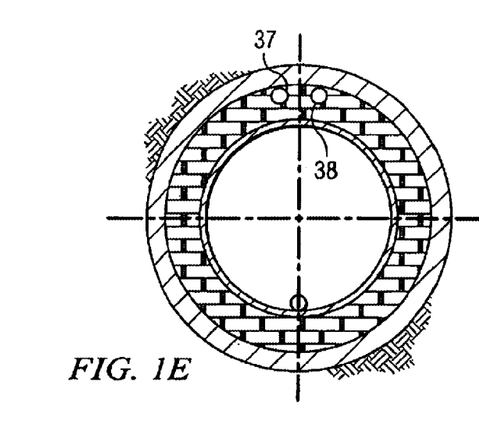
Figure 2A:
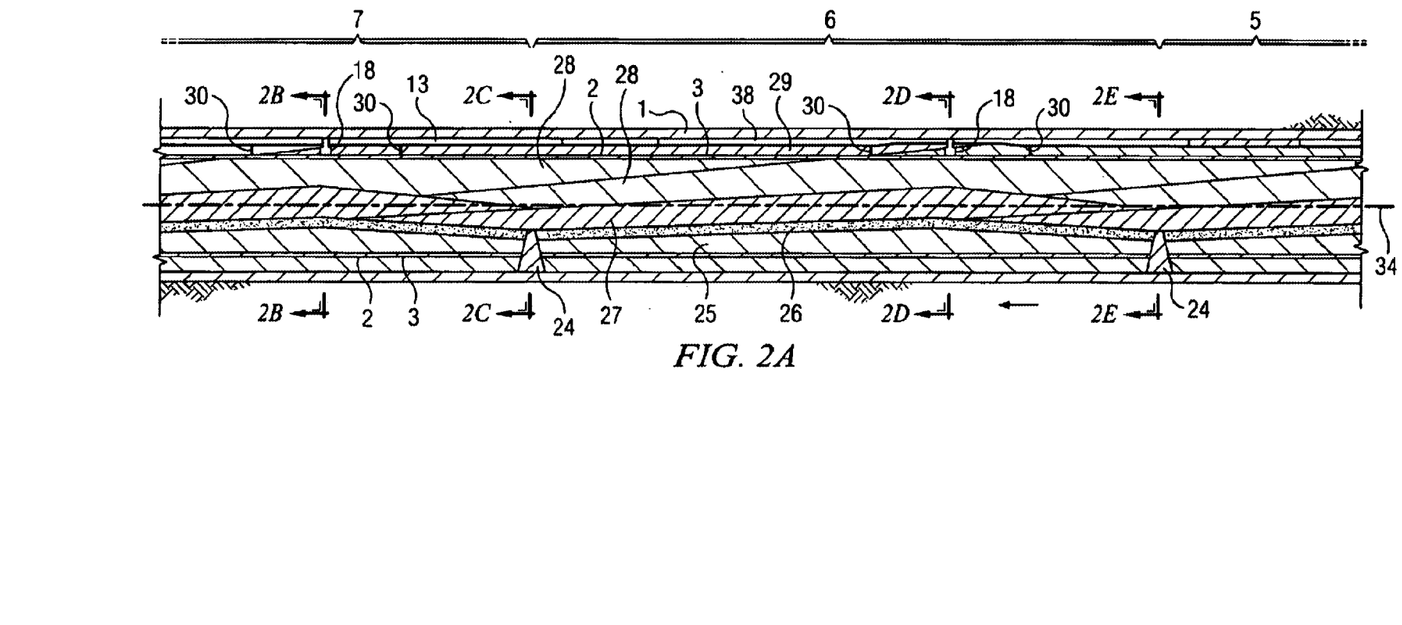
Figure 2B:
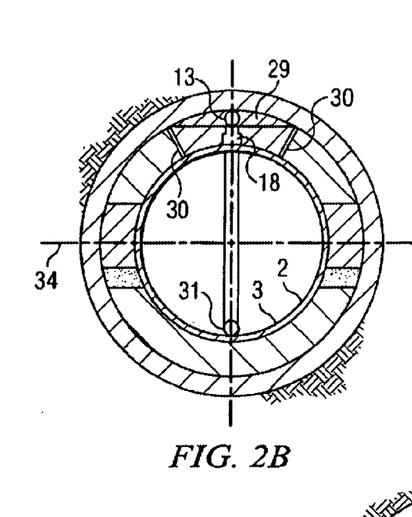
Figure 2C:
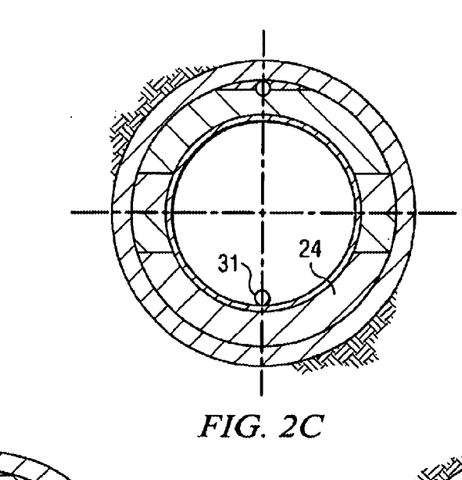
Figure 2D:
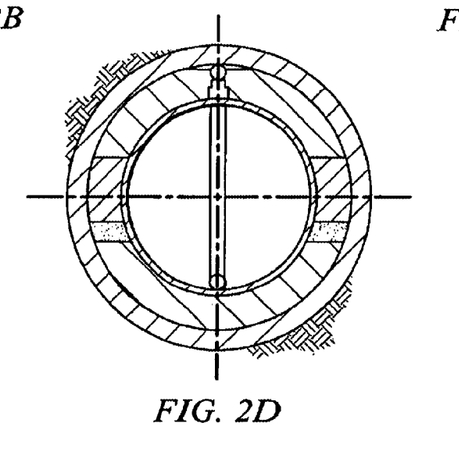
Figure 2E:
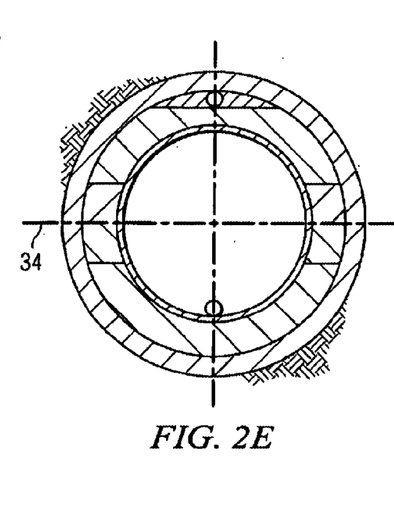
Figure 3A:
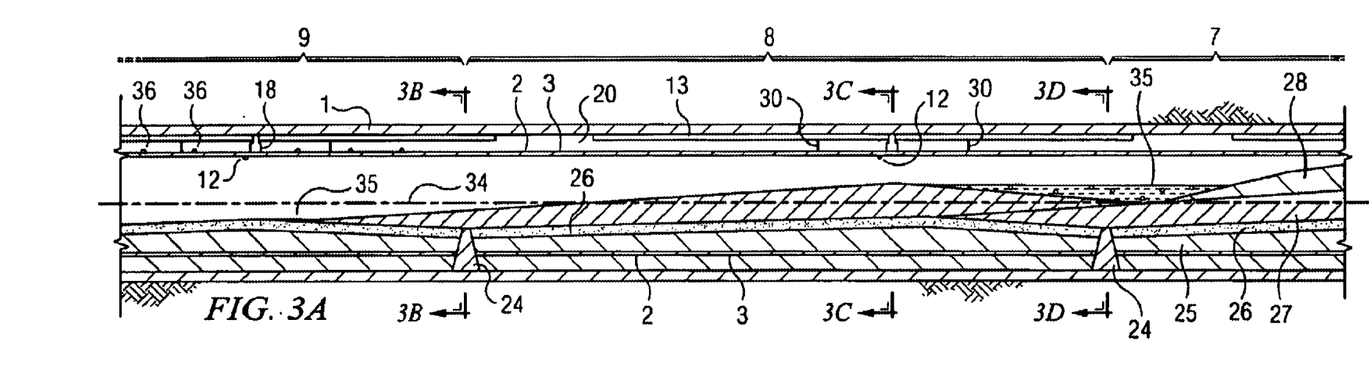
Figure 3B:
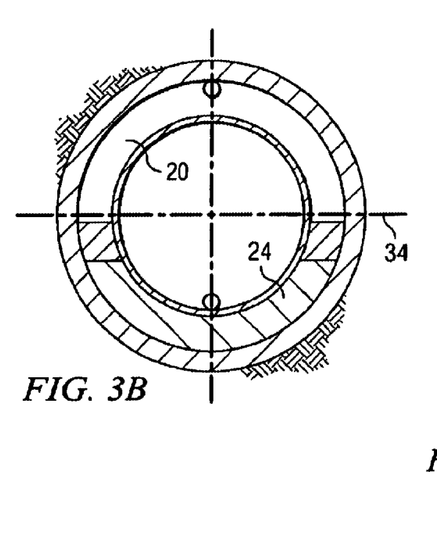
Figure 3C:
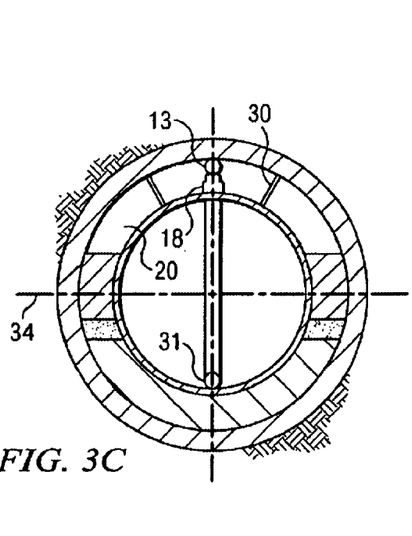
Figure 3D:
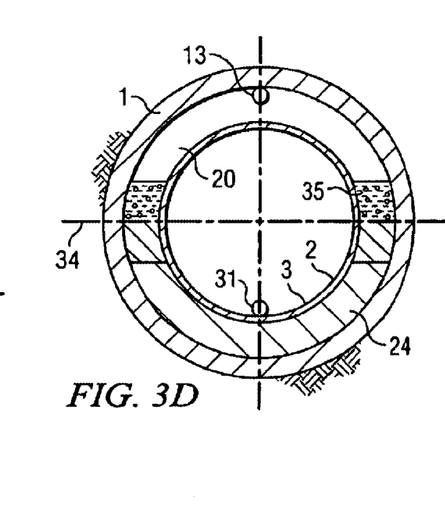
Figure 4A:
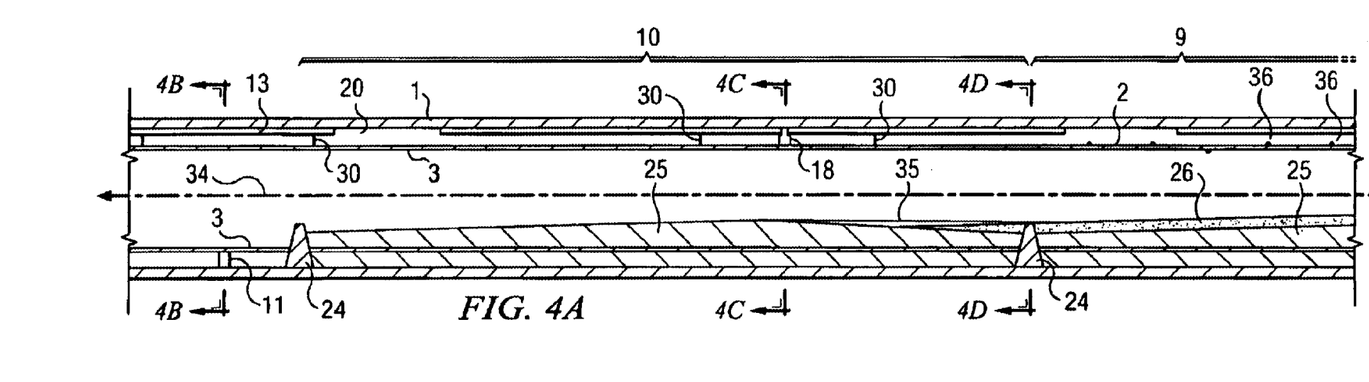
Figure 4B:
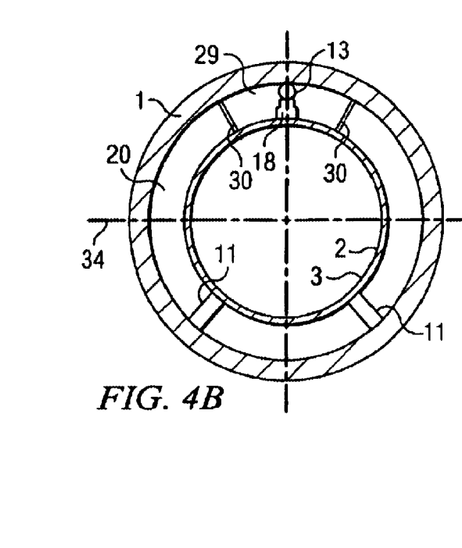
Figure 4C:
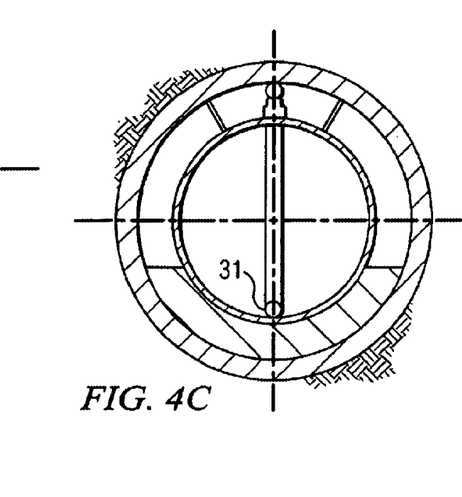
Figure 4D:
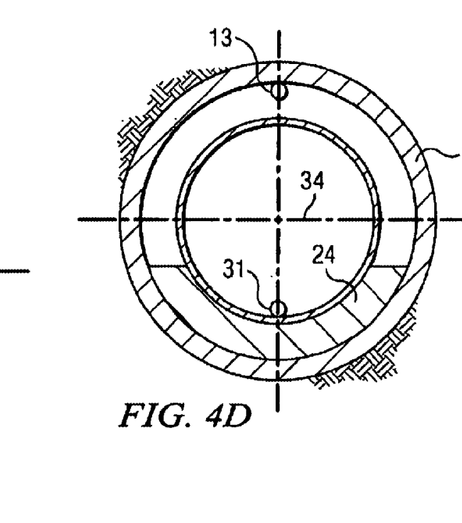
Figures 5A, 5B:
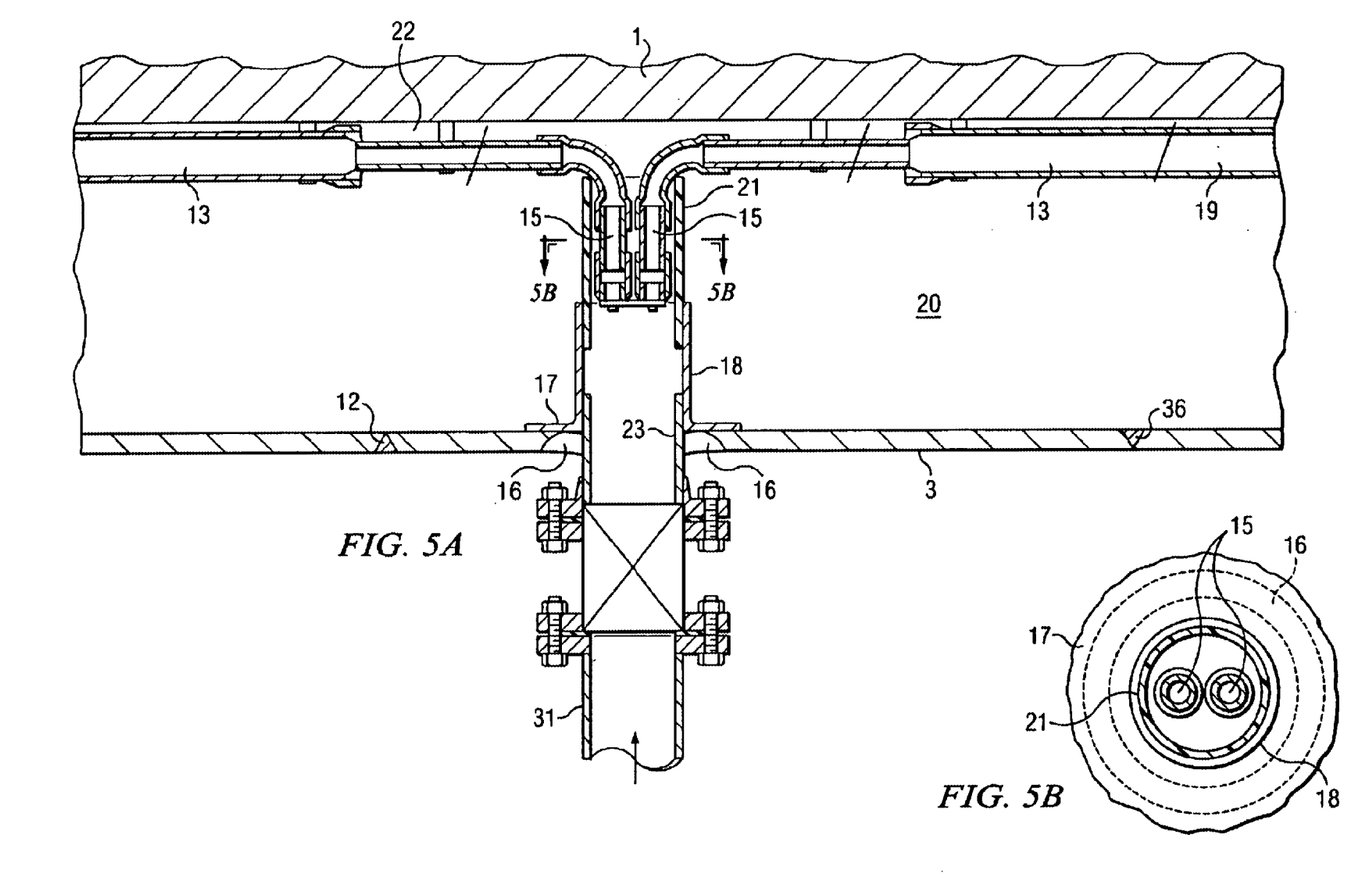
FIGS. 5 to 8 each show enlarged sectional views in the region of an opening, in each case in different operating states, namely FIG. 5 with attached high-pressure line for backfill concrete, FIG. 6 with attached water flushing, FIG. 7 with connected subsequent-grouting lines and FIG. 8 in the final state.

As viewed in the working axial direction, shown along a pipeline axis 34 (see FIG. 4), before a pipe section 4–10 is brought up to the corresponding location, subsequent-grouting pipeline arrangements 13 are fastened in an advancing manner at the roof of the gallery 1 parallel to the pipeline axis, the free ends, angled downward 15, of said subsequent-grouting pipeline arrangements 13 (see FIG. 5, for example) ending in the axial direction 34 at the level of the openings 16 to be subsequently produced in the pipe conduit 2.

Openings 16 are produced at the apex of the pipe conduit 2, an opening 16 being provided for each section 4–10. The position of the opening 16 relative to the two ends of the section 4–10 is determined in particular according to the inclination of the gallery 1 or of the pipe conduit 2, and according to the flowability of the backfill concrete used. The position of the opening 16 also depends in principle on the length of the individual pipe or on the length of the pipe conduits 2, moved into position in each case, in the gallery 1. The opening 16 is offset from the center in the direction of the upper pipe end. In the present case, the opening 16 is about 50 m from the upper pipe end and 100 m from the lower pipe end of each section 4–10. The opening 16 is produced by flame cutting a plate, which is stored for the subsequent re-welding of the opening 16.

An arched plate 17, which carries a filling connection 18, is then mounted on the outside of the product pipe in a pressure-tight manner concentrically to the opening 16, and is welded in position in such a way that the filling connection 18 points perpendicularly upward.

The subsequent-grouting pipeline arrangements 106 each have a pipe section 19 (lines at least DN 50 mm), which has a multiplicity of bores that are distributed over its periphery, but which to begin with are tightly closed, for example, by means of an adhesive tape, so that the subsequent-grouting pipeline arrangements 13 remain free of backfill concrete during the subsequent pressureless introduction of the backfill concrete into the cavity 20.

A plastic pipe 21 is pushed into the filling connection 18 and pushed as far up toward the cavity apex 22 as permitted by the subsequent-grouting pipeline arrangements 13. The plastic pipe 21 is finally adhesively bonded in place in the filling connection 18 with sealing agent. In this case, the downwardly pointing free ends 15 of the subsequent-grouting pipeline arrangements 13 are located inside the plastic pipe 21.

Furthermore, a pipe section 23 provided with an external thread is screwed into the filling connection 18, provided with an internal thread at its bottom end, and various devices can be subsequently attached to this pipe section 23 during operation.

Furthermore, flow barriers 24 of like-grained concrete are placed along the pipe conduit 2, these flow barriers 24 defining the ends of the respective sections 4–10. As already explained further above, the distances between the flow barriers 24 are established by the predetermined gradient of the pipeline and by the flow angle of the backfill concrete selected. The flow barriers 24 define the length of the individual filling sections 25–29.

Typically, it is possible for the opening 16 for the filling connection 18 to be produced only in situ in the apex region 22 of the respectively last pipe, since moving the pipes or pipe conduits into position at a precise angle is scarcely possible at a tolerable cost.

While the subsequent-grouting pipeline arrangements 13 can therefore already be attached before the respectively last pipe, and the openings 16 can be produced in the respectively last pipe, and the filling connections 18 can be welded on, that is to say that the pipe-laying work can be carried out, the filling of the cavities 20 between line conduit and gallery wall can already be carried out at the sections lying further back 4–10.

To this end, a pressure line 31 (see FIG. 5) laid in the product pipe to the filling connection 18 is attached to the pipe section 23 and the cavity 20 is filled layer by layer (e.g., filling layers 25–29) with backfill concrete.

The quantity of the first filling layer 25 depends, inter alia, on the uplift force of the liquid backfill concrete and on the weight of the pipeline between the flow barriers 24. The uplift force of the backfill concrete must not exceed the weight of the pipeline with a reduced number of fitted uplift safety features 30.

After the settling and consolidation of the first filling layer 25, a thin, specifically lighter backfill-concrete mixture is introduced in order to close the settling gap produced at the pipe conduit 2, prevent renewed uplift forces on the pipe, and secure the adhesion forces between pipe and backfill concrete.

After the stiffening of the backfill concrete, further layers 26–29 may be filled until the backfill concrete comes out at the next filling connection.

After each filling layer 25–28 (with the exception of the last filling layer 29), water flushing is carried out for cleaning the system in order to ensure the permeability of the filling connection 18 for the next introduction of backfill concrete. The flushing water introduced does not change the consistency of the backfill concrete; the consistency would be altered only by forced mixing. The flushing water collects in the forming troughs of the backfill concrete introduced and is displaced by the subsequently introduced backfill concrete. This cleaning of the filling connections is effected via the pressure line 31 after the latter has been cleaned by the introduction of water instead of backfill concrete.

Figure 6:
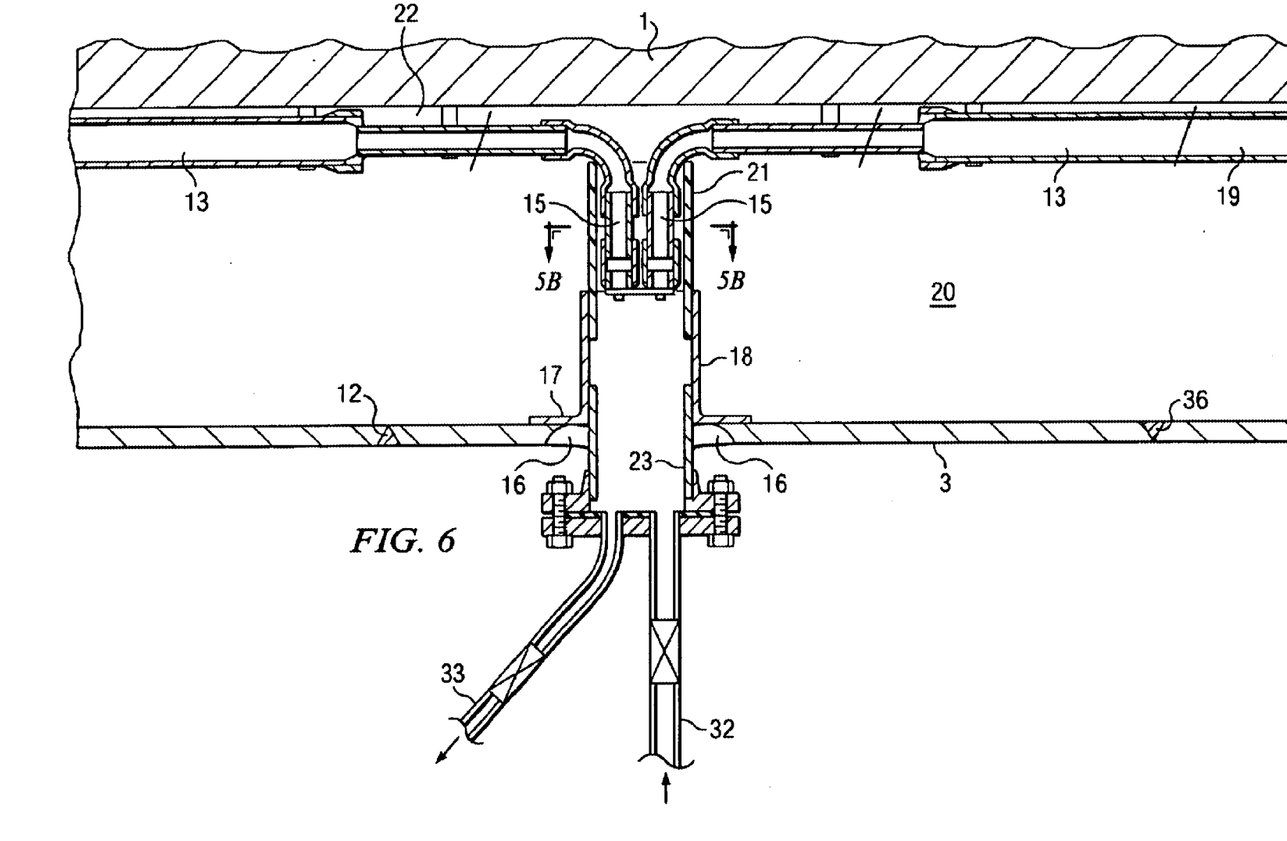

After the introduction of the last filling layer 29 at the preceding section, a water-flushing device 32 (see FIG. 6) is attached to the pipe section 23 of the filling connection 18 at the section which is adjacent in the working axial direction 34, and water flushing is carried out in order to ensure the conductivity for the last filling layer 29.

The cleaning of the pressure line 31 is effected by water flushing and emptying of the line filled with backfill concrete in a section not yet acted upon.

Once the filling binder has a settling degree of 3%, a cavity 20 results above the last filling layer 29 as a result of settling. In the region of the filling connection 18, the settling height is still only within the millimeter range and the subsequent-grouting section is therefore delimited. During the subsequent grouting of the remaining residual space, settling water and air 35 can escape through this gap, or else it can escape through the vent line 37, which is described below in connection with the grouting of the residual space at the roof.

Figures 7A, 7B:
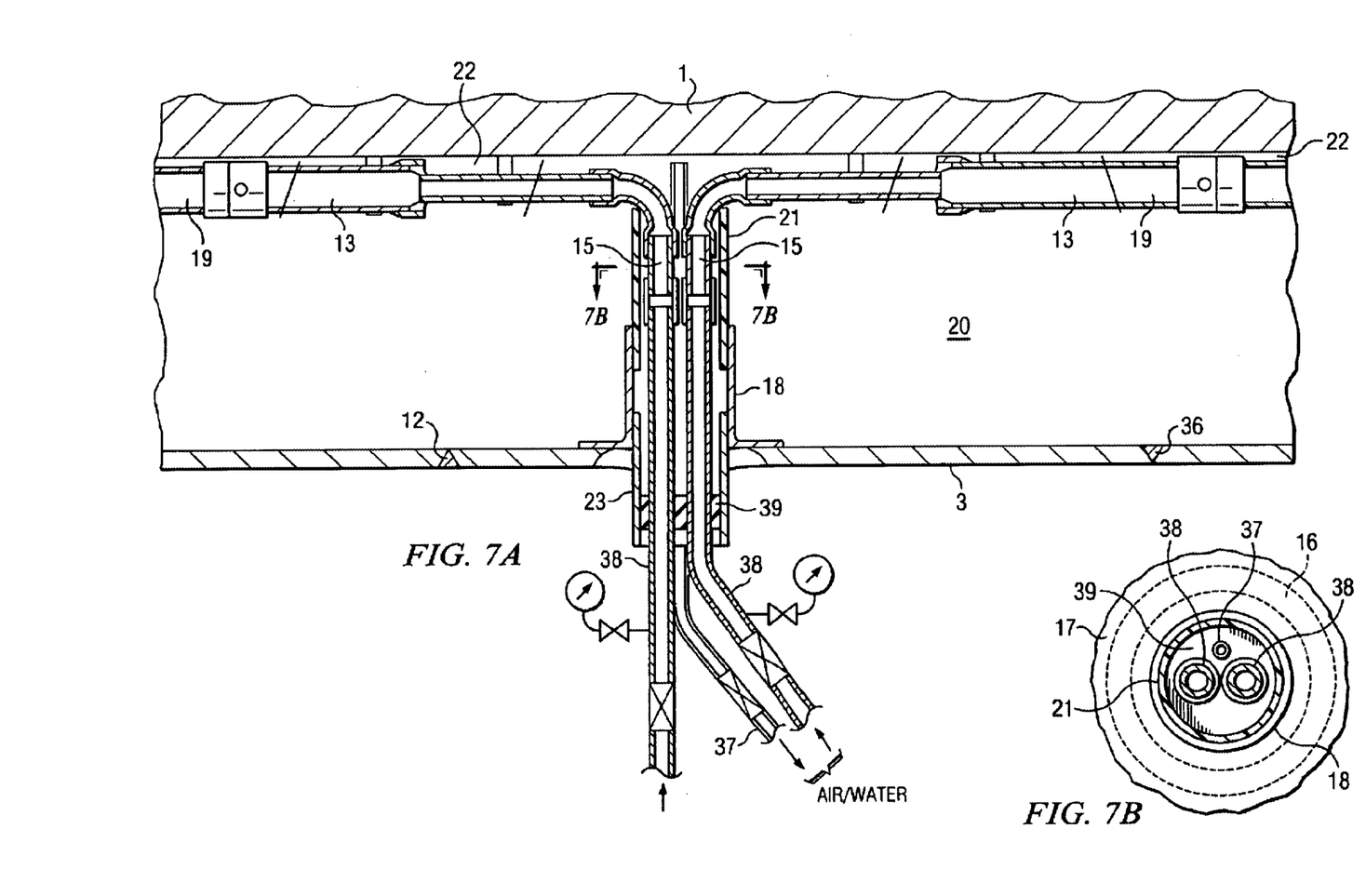

Reference is now made to FIG. 7. Once the filling connection 18, after the backfill concrete has started to stiffen, has been cleaned manually up to the bottom end of the subsequent-grouting device, the subsequent-grouting lines 38, for the subsequent grouting, are connected to the downwardly pointing ends 15 of the firmly installed subsequent-grouting pipeline arrangements 13. Furthermore, a vent line 37 is directed through the filling connection 18, this vent line 37 ending directly below the roof in order to be able to draw off the settled water and/or air 35 here as far as possible. The exterior space is sealed off from the interior space via a compression seal 39, which bears on the outside against the pipe section 23 and through which the two subsequent-grouting lines 38 and the vent line 37 are directed.

During the continuous filling of further sections, the requisite pressure (about 7 bars) for the grouting of the residual space at the roof can be built up by throttling the filling line as a filling level control 33. The adhesive seals at the pipe sections 19 of the subsequent-grouting pipeline arrangements 13 are bridged in the process and backfill concrete penetrates into the residual space. The subsequent grouting is mostly effected from the high point to the low point of the respective section in order to displace as far as possible all the settling water and/or air 35 via the vent line 37.

The subsequent grouting is effected until backfill concrete comes out at the next filling connection 18 or until material flow can no longer be detected when the grouting pressure is reached. The subsequent grouting is effected progressively section by section in the working direction.

Figure 8:
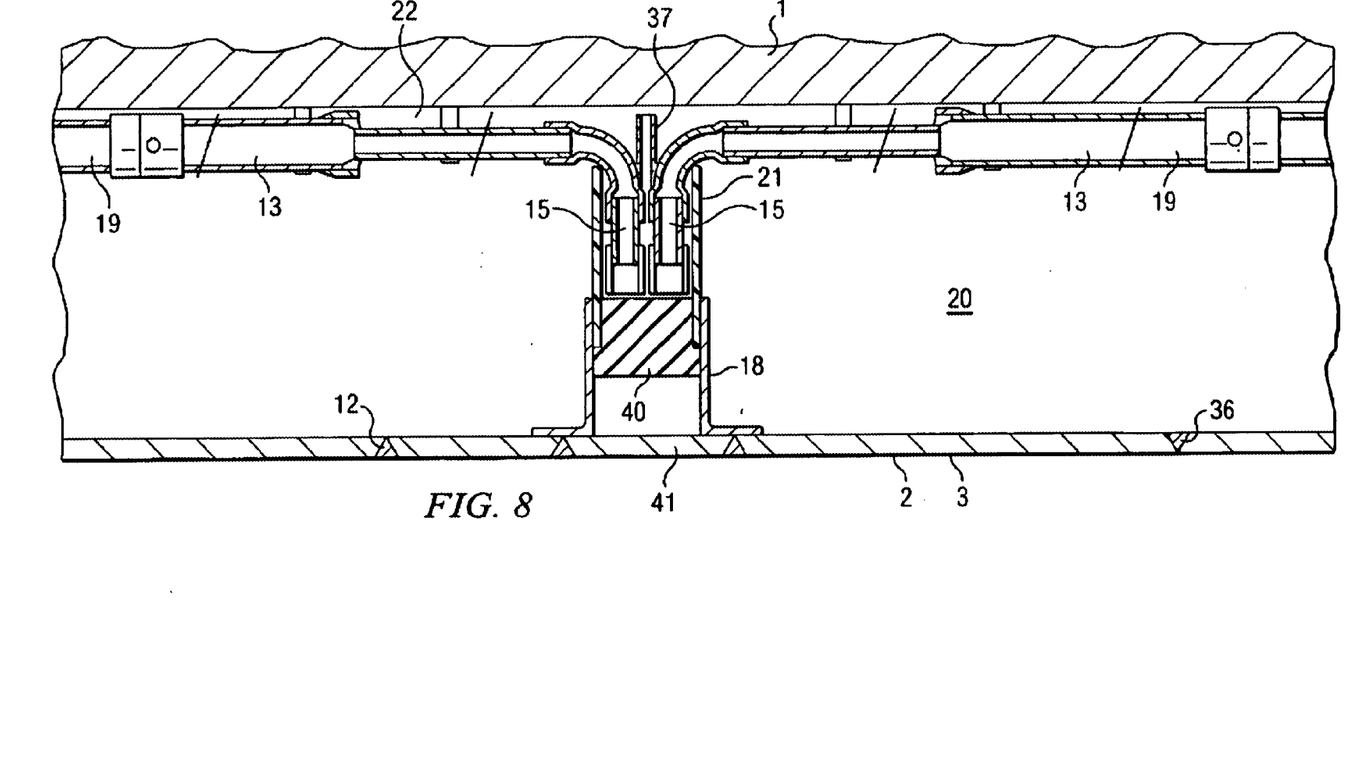

After completion of the subsequent grouting, the subsequent-grouting lines 38 and the vent line 37 and also the compression seal 39 are removed again and, after cleaning of the filling connection 18 and removal of the pipe section 23, a compression seal 40 (see FIG. 8) is put into the filling connection 18 or the pipe 21 fastened therein in order to hold back moisture from the backfill concrete.

Finally, the pipe plate 41 flame cut earlier in order to produce the opening 16 is welded in place again.

The invention may thus be summarized as follows:

The systematic pipe laying is effected in the already produced cavities (galleries, supply tunnels, 25 etc.). The conditions for introducing backfill concrete through the pipe apex into the surrounding cavity are to be created. At a later point in time, the cavity is filled layer by layer in predetermined sections; the uplift forces of the liquid backfill concrete are to be taken into account in the process. After the hardening of the last filling layer, the resulting residual space at the roof is grouted section by section. Air and settling water are displaced and drawn off.

The separation of pipe laying and pipe encasing in work cycles independent of one another guarantees:

the endless advance of the pipeline defined filling sections of very large length defined grouting sections of very large length operation as underground site with 24 hours/day for each individual professional group (pipe layers, concrete laborers) in each working phase, as long as the filling lags in an 5 appropriate manner stress-free connection of the individual pipe conduits, since only free pipe ends are always connected to one another in the cavity small uplift forces on the pipeline by introducing the backfill concrete layer by layer the required covering of the pipeline with backfill concrete as anti-corrosion protection the filling of the residual space at the roof with high pressures during the normal filling the filling of the residual space at the roof in defined sections cavity-free filling, thus no settling due to collapse of the rock thus no water conductivity at the cavity thus no gas accumulation at the cavity roof no contamination of the cavity by backfill concrete emptying of all of the delivered quantity of backfill concrete into the cavity (no disposal of residual or excess quantities as special waste necessary)

cleaning of the pressure line by water flushing into the cavity cleaning of the filling connections by water flushing from the pressure line utilization of the pressure line as filling, grouting and water-flushing line no vertical shrinkage joints at the partitions short execution times economical production costs While various embodiments of a method and system for encasing a pipe conduit, laid in an endless manner, with backfill concrete have been described above, it should be understood that they have been presented by way of example only, and not limitation. Thus, the breadth and scope of the invention(s) should not be limited by any of the above-described exemplary embodiments, but should be defined only in accordance with the following claims and their equivalents. Moreover, the above advantages and features are effected in described embodiments, but shall not limit the application of the claims to processes and structures accomplishing any or all of the above advantages.

What is claimed is:

1. A method of encasing a pipe conduit (2), laid in a gallery (1) in continuous manner, with backfill concrete, with a working direction advancing in the axial direction of the gallery, said laying and encasing of said pipe conduit being carried out in working steps independent of each other, and said gallery including said pipe conduit being divided into sections of equal length, and an opening being provided at the pipe apex in each section for introducing the backfill concrete into a cavity between said pipe conduit and the wall of said gallery, characterized in that the backfill concrete is introduced into the opening into said cavity between said pipe conduit and said wall of the gallery in each section layer by layer, as a first filling layer such an amount of backfill concrete being introduced that in said section the buoyancy of the buoyancy force of said backfill concrete does particularly not exceed the weight of the pipe conduit, and after settling and hardening of the first filling layer a second filling layer for closing a settling gap and for securing adhesion forces between said pipe conduit and said backfill concrete is inserted, and after the respective stiffening of the backfill concrete the cavity between said pipe conduit and said wall of the gallery is substantially filled layer by layer, at least introducing the respective last layer being realised in sections in the working direction subsequently following each other, and that the openings of the filled sections are subsequently closed.

2. The method according to claim 1, characterized in that said method also comprises the following steps:
 a) fastening of subsequent-grouting pipeline arrangements, said subsequent-grouting pipeline arrangements running at the roof of the gallery in axial direction and ending above the respective opening, before the insertion of the backfill concrete layer by layer;
 b) after completely inserting all layers of the backfill concrete, subsequent-grouting by inserting backfill concrete into the subsequent-grouting pipeline arrangements through the pipe conduit and through the respective opening.

3. The method according to claim 1, characterized in that it furthermore comprises the following step:
 introducing flushing water after the introduction of each layer of the backfill concrete, with the exception of the last layer.

4. The method according to claim 1, characterized in that it furthermore comprises the following step:
 introducing flushing water after the placement of the last layer in the respectively preceding section.

5. The method according to claim 1, characterized in that, after arrangement of the opening in the pipe apex of one section and before the introduction of the backfill concrete in this section a filling connection extending perpendicularly upwards is put onto the respective opening onto the outside of the pipe conduits, this filling connection preferably extending up to close to the roof of the gallery.

6. The method according to claim 5, characterized in that the opening of the filling connection is sealed off before the opening within the pipe apex of the pipe conduit is closed.

7. The method according to claim 1, characterized in that flow barriers are fitted at the respective section boundaries before the backfill concrete is inserted layer by layer.

8. The method according to claim 7, characterized in that said flow barriers are produced from like-grained concrete.

9. The method according to claim 1, characterized in that, during inserting of the backfill concrete layer by layer, each backfill-concrete layer is allowed to harden before the next layer is introduced.

10. The method according to claim 1, characterized in that the introduction of the backfill concrete layer by layer is effected by the following steps:
 a) introduction of at least one first filling layer until the pipe-conduit section of a section begins to float on the filling layer or has not quite started to float on the filling layer,
 b) introduction of a second filling layer of specifically lighter backfill concrete after the settling and consilidation of said at least first filling layer, and
 c) introduction of further filling layers after at least partial consilidation of the preceding layer.

11. A system for encasing a pipe conduit plate in a gallery in a continuous manner, with backfill concrete, with a working direction advancing in the axial direction of the gallery, said pipe conduit together with said gallery being divided into a plurality of sections and a closable opening arranged in the pipe apex in each section, a filling connection fastened in the region of the opening to the pipe conduit and oriented perpendicularly upwards, and a high pressure pipe for backfill concrete being provided running internally of the pipe conduit and being releasably connectable to the filling connection, characterized by at least one firmly installed subsequent-grouting pipeline arrangement which is arranged at the roof of the gallery and ends in the region of the filling connection, at least one subsequent-grouting line which runs in the interior of the pipe conduit and which is releasibly connectable to the filling connection instead of the high pressure line and connectable to the at least one firmly installed subsequent-grouting pipeline arrangement.

12. The system according to claim 11, characterized in that two firmly installed subsequent-grouting pipeline arrangements are provided extending from the filling connection essentially in opposite directions.

13. The system according to claim 11, characterized in that each subsequent-grouting pipeline arrangement comprises a pipe section having a number of radial through-holes distributed over the pipe section.

14. The system according to claim 13, characterized in that the through-holes are closed in the beginning, in particular by an adhesive tape.

15. The system according to claim 11, characterized in that the filling connection is welded to the pipe conduit on the outside of the same.

16. The system according to claim 11, characterized in that the filling connection is designed as a threaded connection.

17. The system according to claim 11, characterized in that the filling connection is fastened to the pipe conduit in a pressure-tight manner via an arched flange.

18. The system according to claim 11, characterized in that a plastic pipe extending upward is inserted into the filling connection, said plastic pipe being adhesively bonded to the filling connection.

19. The system according to claim 11, characterized in that a pipe section extending downward is releasably inserted, particularly screwed, into the filling connection.

20. The system according to claim 11, characterized in that, additionally to the at least one subsequent-grouting line, a vent pipe for drawing off air or water is provided running internally of the pipe conduit being directed upwards through the filling connection and sending at the roof of the gallery.

21. The system according to claim 11, characterized in that a line for supplying flushing water is also provided, which line runs internally of the pipe conduit and being releasably connectable to the filling connection, instead of the high-pressure line.

22. The system according to claim 11, characterized in that a seal, in particular a compression seal for sealing-off the exterior space from the interior space, is also provided, which seal is insertable into the filling connection.

23. The system according to claim 11, characterized by a pipe plate which has resulted from the production of the opening and serves to close the opening again by means of welding.

* * * * *